SHOCK-EXCITED RESONANT CIRCUIT SWEEP VOLTAGE GENERATOR

Filed Nov. 12, 1964 2 Sheets-Sheet 1

Inventors
Tsuyoshi Konno
Hiroshi Katagiri
By Stevens, Davis, Miller & Mosher
ATTORNEYS

SHOCK-EXCITED RESONANT CIRCUIT SWEEP VOLTAGE GENERATOR

Filed Nov. 12, 1964 2 Sheets-Sheet 2

Inventors
Tsuyoshi Konno
Hiroshi Katagiri
By Stevens, Davis, Miller & Mosher
ATTORNEYS 3,324,413

SHOCK-EXCITED RESONANT CIRCUIT SWEEP VOLTAGE GENERATOR

Tsuyoshi Konno and Hiroshi Katagiri, Kawasaki-shi, Japan, assignors to Matsushita Electric Industrial Co., Ltd., Osaka, Japan, a corporation of Japan Filed Nov. 12, 1964, Ser. No. 410,407

Claims priority, application Japan, Nov. 14, 1963, 38/61,918; Nov. 15, 1963, 38/61,923; Sept. 14, 1964, 39/52,917, 39/52,920; Sept. 15, 1964, 39/53,319

9 Claims. (Cl. 331—166)

The present invention relates to a sine wave time base system, such as for use in cathode ray tubes and the like.

An object of the present invention is to provide a sine wave time base system, in which a sine wave voltage is produced in a definite time relation with the input signal to be observed, and a portion of the sine wave voltage is employed as a sweep voltage.

Another object of the present invention is to provide a sine wave time base system, in which the sine wave voltage is produced in such a manner that the sine wave voltage produced may readily be controlled by a trigger signal (which is picked off from an input signal to be observed), a portion of the sine wave voltage being used as the time base sweep voltage.

Another object of the present invention is to provide the generation system of an ultra-high-speed sweep voltage, by utilization of a sine wave resonant oscillation caused by charging and discharging of capacitors associated with inductance coils.

A further object of the present invention is to provide a sweep voltage generation system, in which the sine wave sweep voltage is produced at very little power loss in synchronism with the trigger signal.

A further object of the present invention is to provide a sine wave time base system, in which a sine wave volttage is produced in the definite time relation with the trigger signal, a portion of the sine wave voltage being used as the time base sweep voltage, and in which power loss is minimized.

A still further object of the present invention is to provide a sine wave time base system, in which the sweep speed and a repetition rate of sweep may be changed at will.

A still further object of the present invention is to provide a sine wave time base system, in which the sine wave voltage is produced by utilization of the sine wave resonant oscillation caused by charging and discharging of capacitors associated with inductance coils, damping of the sine wave oscillation being accelerated to obtain a high repetition rate of sweep.

There are other objects and particularities of the present invention, which will be made obvious from the following detailed description of the present invention, with reference to the accompanying drawings, in which;

FIGS. 1*a* and 1*b* show conventional sweep voltage generation systems, diagrammatically;

FIGS. 2*a* and 2*b* show diagrammatically a principle of the present invention;

FIGS. 3, 4*a*, 4*b* and 5 are curve diagrams for explanation of principle of the present invention;

Figures 1A, 1B, 2A, 2B, 3, 4A, 4B, 5, 6:
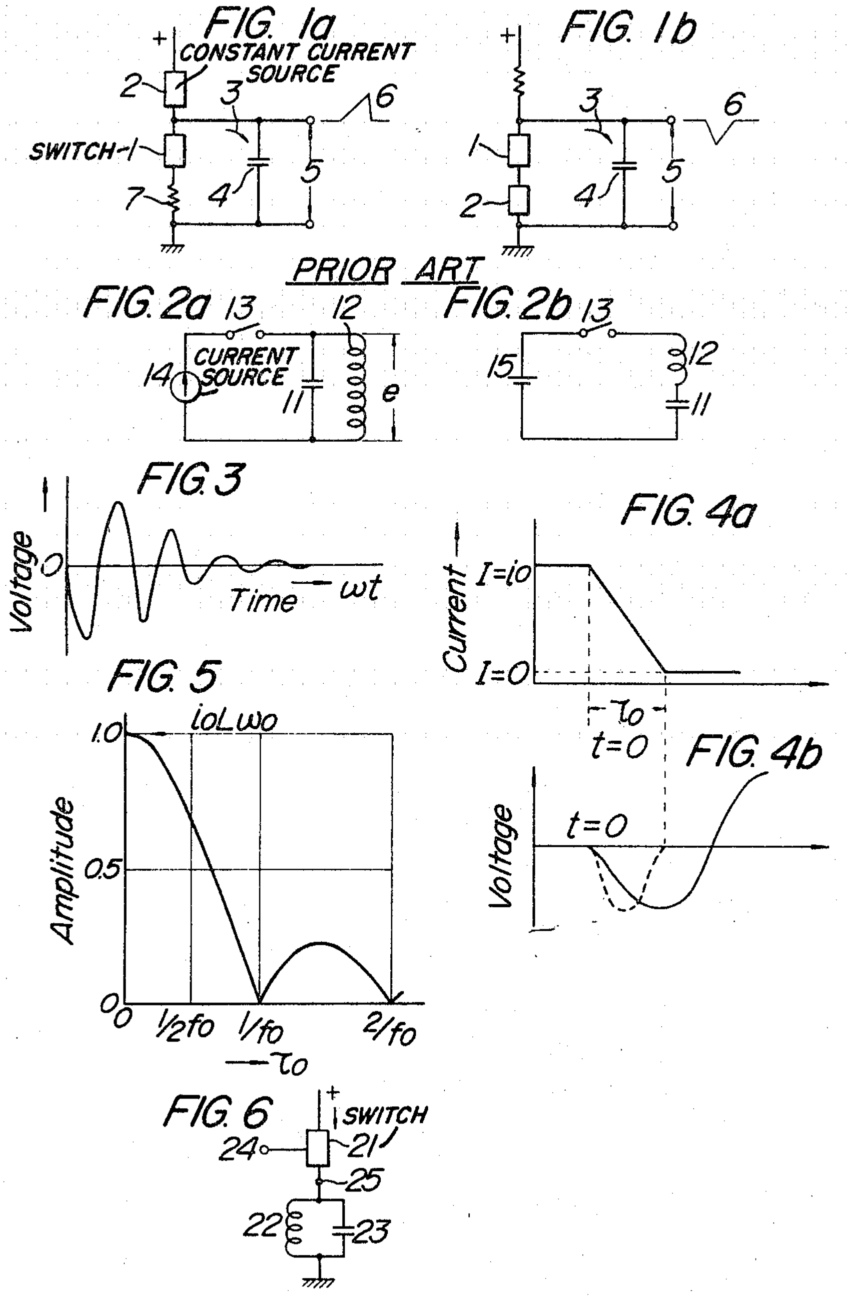
FIG. 6 shows one embodiment of the present invention.

A conventional time base sweep voltage generation system is shown in FIG. 1*a*, which comprises a switch 1, a constant current source 2, a capacitor 4, and a resistor 7, switch 1, capacitor 4 and resistor 7 being connected in a loop. When the switch 1 is operated to open, a constant current 3 charges the capacitor 4 and a voltage 5 which increases, linearly with time is produced as shown by wave form 6. This voltage is employed as the time base voltage.

Another conventional system shown in FIG. 1*b* has a switch 1, a constant current source 2 and a capacitor 4 in a loop circuit, and produces a time base voltage 6 when the switch 1 is operated to close.

By the above systems, however, it is considerably difficult in technical point of view to obtain the sweep voltage above several ten volts per mμsec. It is known to employ sine wave voltage in order to solve the above-mentioned difficulty, but synchronsium being difficult to obtain in such a system, its general application has not been practiced except in a limited field.

According to the present invention, most readily obtainable sine wave voltage is generated in such a manner that it may be controlled by the input signal, and a portion of the sine wave voltage thus obtained is used as the time base sweep voltage, whereby the above-mentioned difficulty is well waived.

Referring to FIG. 2*a*, a capacitor 11, an inductance coil 12, a switch 13 and a current source 14 form a parallel resonance circuit. It is well known that, if the switch 13 is opened (or closed), a sine wave damping oscillation is produced. In a series resonance circuit, as shown in FIG. 2*b*, comprising a capacitor 11, an inductance coil 12, a switch 13 and a voltage source 15, similar damping oscillation is produced by closing of the switch 13.

In the parallel resonance circuit as shown in FIG. 2*a*, for example, if energy has been accumulated in the coil 12 by current flow therethrough from the source 14, and then the switch 13 is opened at the time $t=0$, a sine wave voltage damping oscillation is produced as shown in FIG. 3 across the capacitor 11 or coil 12, at the resonant frequency of the resonance circuit. Considering first one or two periods of the oscillation, the oscillation voltage $e$ may be expressed by the following equation, provided that the initial current $i_0$ is cut off at an infinitely high speed:

$$e=-L\omega_0 i_0 \sin \omega_0 t \qquad (1)$$

where $\omega_0=1\sqrt{LC}$ and $2Q_0>>1$, and C and L are capacitance and inductance of the capacitor 11 and the coil 12, respectively.

The sweeping speed is related with the maximum wave height A which is deduced from the above equation as follows:

$$A=2\pi f_0 i_0 L \qquad (2)$$

where $f_0$ is the resonant frequency.

Equations 1 and 2 are on the assumption that the time $\tau_0$ required for interrupting the initial current $i_0$ is zero. Such an assumption, however, being generally not acceptable, $\tau_0$ is considered having an amount as shown in FIG. 4*a*. Now, the generated voltage may be calculated as follows for $\tau_0<t$:

$$e=(i_0 L/\tau_0)\sqrt{2(1\text{-}\cos \omega_0\tau_0)} \cos (\omega_0 t+\tau_0) \qquad (3)$$

where $\omega_0=1\sqrt{LC}$ and $2Q_0 \gg 1$, and first one or two periods only are considered. Further, $$\varphi_1=\tan^{-1}\frac{\sin \tau_0\omega_0}{1 \cos \tau_0\omega_0}$$

The above equation may be expressed by the solid line curve in FIG. 4*b*.

In the above equation, the amplitude of oscillation for $\tau_0$, $(i_0L/\tau_0)\sqrt{2(1\text{-}\cos\ \omega_0\tau_0)}$, may be normalized with $i_0L\omega_0$ and this normalized value for $\tau_0$ is plotted in FIG. 5

As is understood from FIG. 5, if $$\tau_0<\frac{1}{2f_0}$$

or so, the amplitude is not so affected.

For a special case, if $\omega_0\tau_0=2\pi$, the oscillation ceases at $t>\tau_0$, after $i_0$ has been interrupted.

In general, when $\omega_0\tau_0=2n\pi$, $(n=1, 2, 3 \ldots)$, the oscillation ceases if $t>\tau_0$, and $n$ times of swings occur if $t<\tau_0$. For example, if $n=1$, only one time of swing occurs as shown by dotted line curve in FIG. 4b, from the opening of switch 13 to the complete interruption of $i_0(0<t<\tau_0)$, and thereafter the oscillation is damped. If the solid line portion of the above oscillation voltage, that may be deemed straight, is utilized as the sweep voltage, the time delay is very little from the instant of switch interruption ($t=0$), and it is preferable as the sweep voltage.

Thus, even when the time $\tau_0$ required for complete interruption of initial current is not zero but has a limited value, if $\tau_0$ is properly selected as above-described for example $$\tau_0<\frac{1}{2f_0}$$

decreasing of oscillation amplitude can be made little, and sine wave oscillation sufficient to use as the sweep voltage is obtained. Same applies to the case when the switch 13 in FIG. 2a is closed from its open state. Similar result is also obtained when the switch 13 in FIG. 2b is closed, even if the time required for closing the switch is not zero.

Referring now to FIG. 6 showing an embodiment of the invention, it comprises a switching circuit 21, an inductance coil 22, a capacitor 23, a gating input terminal 24 and an output terminal 25. An initial current $i_0$ is supplied through the switch 21, and when a gate signal in synchronism with the input signal is applied to the input terminal 24 to open the switch 21, the voltage produced thereby is obtained at the output terminal 25. The switching circuit 21 may be constructed by use of vacuum tube or the like.

As has been understood from the foregoing description, according to the present invention, a resonant circuit consisting of inductance coil and capacitor is excited to produce rapidly oscillation voltage in synchronism with the trigger signal, and a usbstantially straight portion of the oscillation voltage being utilized as the time base sweep voltage. The deviation from exact linearity of the above-mentioned portion of oscillation voltage is practically little, and may readily be made as small as 1% or so.

In addition, with the above arrangement, an ultra high sweep speed can readily be practiced technically, with simple control of cut-in and cut-out of the initial current $i_0$. Further, by proper selection of L, C, and $i_0$, any desired sweep speed may be obtained.

As has hereinbefore been described, when a condition, $\omega_0\tau_0=2\pi$, is satisfied, the oscillation disappears for $t\geqq\tau_0$ after the interruption of $i_0$, and for $t<\tau_0$, only one swing is effected. According to the invention, the substantially straight line portion of the dotted line curve (FIG. 4b) is preferably used as the sweep voltage. As is clear from FIG. 4b, the time delay from beginning of interruption of switch is least with such an arrangement as above, and consequently, the repetition rate of sweeping can be made high, in comparison with the case when the damping oscillation is used for sweeping, in which case, next sweeping cannot be effected before the damping oscillation has ceased.

As described hereinbefore, it is known to use a sine wave as the time base voltage, but it has never been known how to generate sine waves in synchronism with input signals to be observed. According to the present invention, however, the sweep voltage can be generated in synchronism with input signals, with very little power loss.

Referring again to FIG. 2a, current $i_0$ from current source 14 flows through the parallel resonance circuit of inductance and capacitor 11 by way of switch 13. When the switch 13 is opened in synchronism with the input signals, a voltage $e$ appears across the coil 12 as follows, provided that loss is neglected:

$$e=-i_0L\omega_0 \sin \omega_0 t, \omega_0=\frac{1}{\sqrt{LC}}$$

where L is inductance of coil 12 and C is capacitance of capacitor 11.

The most undesirable result when this voltage is used as the time base sweep voltage, is high power consumption. For example, in order to obtain a rate of sweep voltage change of 30 v./0.1 mμsec., current $i_0$ as high as 1.5 A. is required with $L=2\mu$h. and $C=5$ pf.

Figure 7:
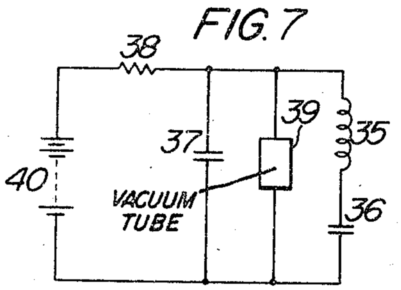
FIGS. 7 to 10 illustrate principle of the present invention.

According to the invention, however, such an undesirable point as above-mentioned is well removed. Referring to FIG. 7, a series resonance circuit of inductance coil 35 (inductance $L_0$) and capacitor 36 (capacitance $C_1$) is associated with a vacuum tube 39 as an active element. Capacitor 37 represents the parallel capacitance $C_0$ of the vacuum tube. The above circuit is connected across a D.C. voltage source 40 through a series resistor 38.

Figure 8:
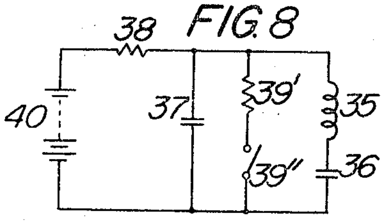

If the vacuum tube 39 is caused to act merely as a switch, the former is equivalent to a resistor 39 (resistance $r$) and a switch 39'' as shown in FIG. 8. In this figure, the resistance R of the resistor 38 is selected so high that it has no relation with the oscillation of resonance circuit of capacitors 36 and 37 and the coil 35, that is, the following conditions are satisfied:

$$C_0 \ll C_1 \text{ and } r \ll R$$

Then, capacitors 36 and 37 are charged from D.C. source 40, when the switch 39'' is open.

When the switch 39'' is closed under the condition, $R \gg r$, the charge on the capacitor 37 is discharged through the resistor 39' of resistance $r$, and the terminal voltage of the capacitor 37 approaches to zero rapidly. However, the charge on capacitor 36 cannot change rapidly due to the existence of the coil 35, but the capacitor 36 maintains its initial terminal voltage for a while. As a result, if the switch 39'' is opened again at the time when the terminal voltage of capacitor 37 has decreased, oscillation occurs in the circuit of coil 35 and capacitors 36 and 37.

Figure 10:
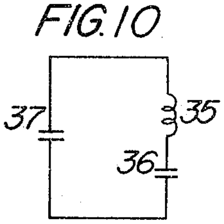
Figure 9:
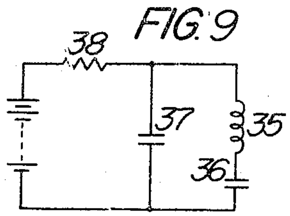

An equivalent circuit of the above is shown in FIG. 9. Since the resistance R of resistor 38 is high enough, directly after the opening of switch 39'', that is, for the beginning of oscillation, the equivalent circuit may be re-drawn as in FIG. 10. Let it be assumed that the voltages of the capacitors 36 and 37 directly after the opening of switch 39'' are $e_0$ and $e_1$, respectively, and current $i_0$ flows through the inductance coil 35. Then, the terminal voltage $e$ of capacitor 37 directly after the beginning of oscillation is $$e=\frac{i_0}{C_0\omega_0}\sin \omega_0 t-(e_0-e_1)\cos \omega_0 t+e_0$$

$$=e_0+\sqrt{\left(\frac{i_0}{C_0\omega_0}\right)^2+(e_0-e_1)^2}\sin(\omega_0 t-\varphi)$$

where $$\varphi=\tan^{-1}\frac{C_0\omega_0(e_0-e_1)}{i_0},\quad \omega_0=\frac{1}{\sqrt{L_0C_0}}$$

As is obvious from the above equation, the amplitude of oscillation depends much on the voltage difference of capacitors 36 and 37, and the current $i_0$ flowing through the inductance coil 35. Consequently, in order to obtain increased amplitude of oscillation, the capacity $C_1$ of the capacitor 36 should be selected large in comparison to the capacity $C_0$ of capacitor 37. In addition, by virtue of the large capacity $C_1$ of the capacitor 36, current $i_0$ flowing through the coil 35 can be large without substantial change in the terminal voltage.

Figures 11, 12, 13:
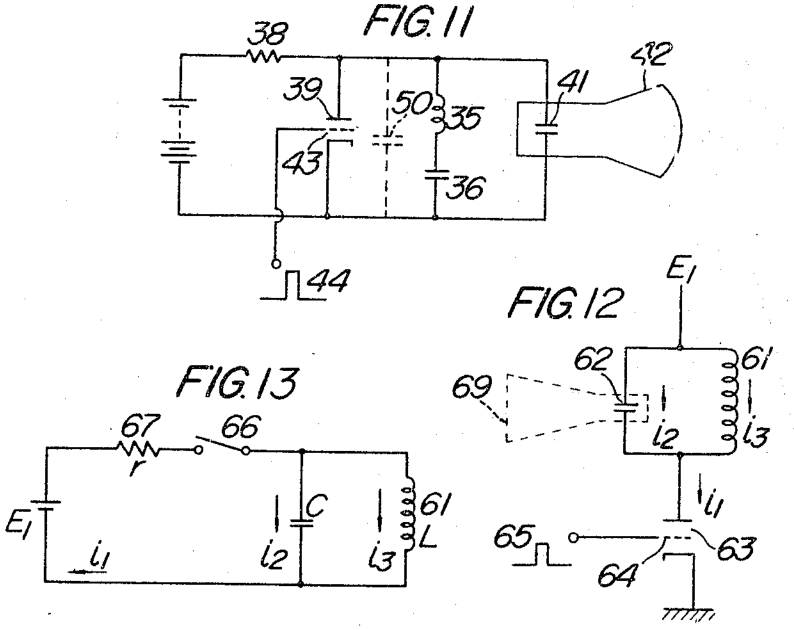
FIG. 11 shows another embodiment of the present invention.
FIG. 12 shows a further embodiment of the present invention.
FIG. 13 is an equivalent circuit diagram of the embodiment shown in FIG. 12.

Referring to FIG. 11, the embodiment shown comprises a vacuum tube 39 as switching element, the tube 39 having an inter-electrode capacitance 50, and a cathode ray tube 42 having deflecting plates 41. The vacuum tube 39 has a grid 43, and is controlled by application thereon of an electric pulse 44. It will be seen that the inter-electrode capacitance 50 and the capacitance of deflecting plates 41 connected in parallel corresponds to that of capacitor 37 in FIGS. 8 to 10. The grid 43 of the vacuum tube 39 is negatively biased enough to maintain the tube 39 non-conductive. This corresponds to the state that switch 39'' is open in FIG. 8.

If a positive pulse 44 is applied in the above-mentioned state on the grid 43 in synchronism with input signals to be observed, the vacuum tube 39 is rendered conductive. This corresponds to closure of switch 39'' in FIG. 8. When the pulse 44 disappears, the vacuum tube is rendered non-conductive again, and the current becomes equivalent to FIG. 9. If the resistance 38 is selected sufficiently high (higher than 10KΩ), the circuit is equivalent to FIG. 10. Thus, the sine wave voltage of damping oscillation is applied across the deflecting plates 41 of the cathode ray tube 42, and may be used as the sine wave time base sweep voltage.

With the above arrangement, the voltage source is required to supply relatively low power only sufficient to charge the capacitors during the period when the vacuum tube 39 is non-conductive, and consequently, power consumption is minimized.

Referring again to FIG. 2*a*, current $i_0$ is supplied to the parallel resonance circuit of capacitor 11 and inductance 12 through switch 13. When the switch 13 is opened in synchronism with an input signal to be observed, a damping oscillation occurs in the resonance circuit, but if power loss in the resonance circuit is large, the oscillation cannot be of correct sine wave. However, it may be said substantially sine wave oscillation, and in addition, if it satisfies the following condition, the linearity of the time base is well maintained:

$$\frac{\omega_0}{8f_r} \geq Q \geq \frac{\omega_0 t}{\epsilon_s} \qquad (4)$$

where $Q$=the quality factor of the circuit,
$\omega_0$=the angular frequency of the circuit,
$f_r$=the repetition rate of sweeping,
$\epsilon_s$=the error of the sweep speed,
$t$=the sweep time.

Satisfactory result is obtained, if the circuit is designed to have quality factor Q satisfying the above relation (4). Thus, according to the present invention, the above-described fact is utilized that the linearity of time base is not damaged by distortion of sine wave form, if the above-mentioned relation is kept. Furthermore, it may be said that the power loss in the resonance circuit is made effectively large for damping the oscillation rapidly, resulting in increased repetition rate of the sweep.

Referring again to FIG. 11 the circuit shown is constructed to have power loss satisfying the relation (4) by proper selection of quality factors of respective the capacitors and the inductance coil. In case when the inductance coil 35 and capacitors 36, 41, 50, are of low-loss elements, the resistance value R of resistor 38 may be determined for satisfying the relation (4). It should, however, be noted that R must be sufficiently large in comparison with the internal resistance $r$ of vacuum tube 39 when it is conducting.

It may be said that the system having a parallel resonance circuit with normally flowing current for accumulating energy in the inductance coil is disadvantageous because of large power consumption. Such a disadvantage may be eliminated, and at the same time, the sweep speed may be changed in an easy manner, by means of arrangement to be described below.

Next, referring to FIG. 12 the system shown comprises a parallel resonance circuit consisting of an inductance coil 61 and a capacitor 62, which may be presented by the capacity between deflecting plates of a cathode ray tube 69, and a vacuum tube 63 as switching element. If a positive pulse 65 of pulse width $t_0$ is applied to the grid 64 of vacuum tube 63, in synchronism with the input signals to be observed, the vacuum tube is rendered conductive for a time interval $t_0$, with internal resistance $r$, and then cut off, whereupon sine wave voltage is generated across the coil 61, which may be used as the sweep voltage. The internal resistance $r$ of vacuum tube 63 serves for the insufficient damping of the parallel resonance circuit, and an equivalent circuit with the tube 63 conducting may be as shown in FIG. 13 in which switch 66 and resistor 67 represent the vacuum tube. Current $i_3$ flowing through the inductance coil 61 is given, thus $$i_3 = \frac{E_1}{r}\left[1 + \frac{\omega_0}{b} e^{\frac{\omega_0 Qt}{2}} \sin(bt - \varphi)\right] \qquad (5)$$

where $\omega_0$=an angular frequency of an LC resonance circuit, $$Q = \frac{r}{L\omega_0},\ (Q<2),$$

$$b = \omega_0 \sqrt{1 - \frac{Q^2}{4}}$$

$$\varphi = \tan^{-1} \frac{b}{a}$$

$$a = \frac{\omega_0 Q}{2}$$

When the vacuum tube is cut off again, the parallel resonance circuit of coil 61 and capacitor 62 generates sine wave oscillation, with the initial condition determined by the current through inductance coil 61 and the charge on capacitor 62. The amplitude of the above oscillation varies depending upon the length of time during which the vacuum tube is conducting. When $$t = \frac{\pi}{b}$$

in the above equation, the amplitude is maximum. The condition of $$t = \frac{\pi}{b}$$

corresponds to the time interval during which the vacuum tube is conducting, that is, the width of positive pulse 65 applied to the grid 64. When the pulse width is not $\pi/b$, the amplitude of oscillation occurring after cut off may take various values. Thus, the sweeping speed can be controlled by varying the pulse width for varying the amplitude of sine wave oscillation. It is obvious that this discussion is similarly applicable to the system of FIG. 7, provided that $C_1 \gg C_0$.

With the above arrangement, current does not flow normally, but flows for a minute interval of time to generate sine wave oscillation, thus decreasing power consumption. In addition, by varying the time interval of current flow, the sweeping speed may be varied at will.

What is claimed is:

1. A time base sweep voltage generating system comprising switching means, means for applying a pulse to said switching means, said switching means being in a conductive state only for the duration of said pulse, parallel circuit means connected in parallel to said switching means and including a series circuit consisting of inductor means through which a current passes when said switching means is in a conductive state, and first capacitor means having a large capacity; and second capacitor means for determining the resonant frequency of said system and having a smaller capacity than said first capacitor means, connected in parallel to said series circuit; a power source means having a positive and a negative terminal connected across said parallel circuit for charging said first and second capacitor means, and resistor means connected between the positive terminal of said power source and said parallel circuit, said second capacitor means discharging when said switching means is placed in a conductive state and said first capacitor means retaining at least a portion of its charge after said switching means is returned to a non-conductive state at which time a damped sine wave oscillation is generated in said parallel circuit providing a time base sweep voltage.

2. A time base sweep voltage generating system as defined in claim 1 wherein said switching means includes a vacuum tube having a grid to which said pulse is applied.

3. A time base sweep voltage generating system as defined in claim 1 wherein said second capacitor means includes stray capacitance connected in parallel relation to the parallel circuit.

4. A time base sweep voltage generating system as defined in claim 3 wherein said second capacitor means further includes the capacity between the deflecting plates of a cathode ray tube connected in parallel relation to the parallel circuit.

5. A time base sweep voltage generating system as defined in claim 3 wherein said inductor means determines the frequency of said oscillation and the speed of sweeping performed by said system.

6. A time base sweep voltage generating system as defined in claim 3 wherein said second capacitor means determines the frequency of said oscillation and the speed of sweeping performed by said system.

7. A time base sweep voltage generating system as defined in claim 3 wherein the width of said pulse determines the amplitude of said oscillation and the speed of sweeping performed by said system.

8. A time base sweep voltage generating system as defined in claim 3 wherein the voltage provided by said power source determines the amplitude of said oscillation and the speed of sweeping performed by said system.

9. A time base sweep voltage generating system as defined in claim 3 in combination with a cathode ray tube having a pair of deflecting plates connected in parallel to said parallel circuit, wherein said sine wave oscillating voltage is applied to said deflecting plates.

References Cited

UNITED STATES PATENTS

| | | | |
|---|---|---|---|
| Re. 21,400 | 3/1940 | Blumlein | 315—29 X |
| 2,383,333 | 8/1945 | Milward | 315—29 |
| 2,595,228 | 5/1952 | Crist | 315—29 X |
| 2,812,437 | 11/1957 | Sziklai | 331—165 X |

ROY LAKE, *Primary Examiner.*

S. H. GRIMM, *Assistant Examiner.*